United States Patent
Subramanian et al.

(10) Patent No.: US 12,536,581 B2
(45) Date of Patent: Jan. 27, 2026

(54) EQUILIBRIUM SOLUTION FOR PERIODIC DOUBLE AUCTIONS TO GENERATE OPTIMAL BIDDING STRATEGIES FOR ENERGY MARKET

(71) Applicant: Tata Consultancy Services Limited, Mumbai (IN)

(72) Inventors: Easwara Naga Subramanian, Hyderabad (IN); Bharat Basavaraj Manvi, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 63 days.

(21) Appl. No.: 18/799,378

(22) Filed: Aug. 9, 2024

(65) Prior Publication Data
US 2025/0086699 A1    Mar. 13, 2025

(30) Foreign Application Priority Data
Sep. 8, 2023 (IN) .............................. 202321060569

(51) Int. Cl.
G06Q 30/00 (2023.01)
G06Q 30/08 (2012.01)
G06Q 50/06 (2012.01)

(52) U.S. Cl.
CPC ............. *G06Q 30/08* (2013.01); *G06Q 50/06* (2013.01)

(58) Field of Classification Search
CPC ...................................................... G06Q 30/08
See application file for complete search history.

(56) References Cited

U.S. PATENT DOCUMENTS

| | | | |
|---|---|---|---|
| 2021/0296896 A1* | 9/2021 | Rajagopal | H02J 3/003 |
| 2025/0086699 A1* | 3/2025 | Subramanian | G06Q 50/06 |
| 2025/0086724 A1* | 3/2025 | Velayudhan Kumar | G06Q 40/06 |

FOREIGN PATENT DOCUMENTS

| | | |
|---|---|---|
| CN | 108565900 B | 9/2021 |
| CN | 115423576 A | 12/2022 |

OTHER PUBLICATIONS

Ji, Xiu, et al. "Bidding strategy of two-layer optimization model for electricity market considering renewable energy based on deep reinforcement learning." Electronics 11.19 (2022): 3107.*

(Continued)

*Primary Examiner* — Kathleen Palavecino
(74) *Attorney, Agent, or Firm* — FINNEGAN, HENDERSON, FARABOW, GARRETT & DUNNER LLP

(57) ABSTRACT

Periodic double auction (PDA) setting is where buyers of the auction have multiple (but finite) opportunities to procure multiple but fixed units of commodity. The goal of each buyer participating in such auctions is to reduce their cost of procurement by planning purchase across multiple rounds of the PDA. Formulating such optimal bidding strategies in multi-agent periodic double auction setting is a challenging problem as such strategies involve planning across current and future auctions. The method and system disclosed herein addresses such setup wherein the composite supply curve is known to all buyers. Specifically, for the complete information setting, the method models the PDA as Markov game and derives Markov perfect Nash equilibrium (MPNE) solution to devise an optimal bidding strategy for the case when each buyer is allowed to make one bid per round of the PDA. The efficacy of the Nash policies obtained is demonstrated with numerical experiments.

12 Claims, 6 Drawing Sheets

(56) References Cited

OTHER PUBLICATIONS

Rashadi et al., "Markov game approach for multi-agent competitive bidding strategies in electricity market," IET Gener. Transm. Distrib., 10(15): 3756-3763 (2016).
Shi et al., "Trading and Pricing Sensor Data in Competing Edge Servers with Double Auction Markets," Journal of Sensors (2021).

* cited by examiner

200 ⎯⟍

┌─────────────────────────────────────────────────────┐
│ sourcing, via one or more hardware processors, a    │
│ current round from among a plurality of rounds (H)  │
│ of an auction offered by a PDA before termination   │ ⎯ 202
│ of the PDA, (i) a composite supply curve providing  │
│ a set of asks that are ordered based price-supply   │
│ quantity pairs consolidated for a set of suppliers  │
│ in an energy market, and (ii) an outstanding demand │
│ of energy of each of a set of buyers (N)            │
│ participating in the PDA, wherein the PDA is        │
│ modeled as a finite horizon Markov game ($\mathcal{M}$) │
└─────────────────────────────────────────────────────┘
                         ↓
┌─────────────────────────────────────────────────────┐
│ applying a joint policy $\left(\pi_*^{b,h}(s)\right)$ for each of the set of buyers │
│ for the current round (h), determined in accordance with the │ ⎯ 204
│ finite horizon Markov game ($\mathcal{M}$) to generate an action for the │
│ buyer (b) defining an optimal bidding strategy with a price- │
│ demand quantity pair for procuring energy for the current │
│ round (h), wherein the joint policy minimizes the cost function at │
│ a Markov Perfect Nash Equilibrium, wherein obtaining the │
│ MPNE by applying the joint policy $\left(\pi_*^{b,h}(s)\right)$ comprises: │
│  ┌────────────────────────────────────────────────┐ │
│  │ determining   (i) a position of the buyer (b)  │ │ ⎯ 204a
│  │ in a sorting list generated by sorting the     │ │
│  │ outstanding demand of the set of buyers in     │ │
│  │ increasing order                               │ │
│  └────────────────────────────────────────────────┘ │
│                        ↓                            │
│  ┌────────────────────────────────────────────────┐ │
│  │ checking availability of sufficient rounds for │ │ ⎯ 204b
│  │ remaining buyers except the buyer (b) to       │ │
│  │ satiate the outstanding demand of the          │ │
│  │ remaining buyers, wherein availability of the  │ │
│  │ sufficient rounds is determined from the       │ │
│  │ ordered set of asks obtained from the          │ │
│  │ composite supply curve                         │ │
│  └────────────────────────────────────────────────┘ │
└─────────────────────────────────────────────────────┘
                         ↓

FIG. 2A

EQUILIBRIUM SOLUTION FOR PERIODIC DOUBLE AUCTIONS TO GENERATE OPTIMAL BIDDING STRATEGIES FOR ENERGY MARKET

PRIORITY CLAIM

This U.S. patent application claims priority under 35 U.S.C. § 119 to: Indian Patent Application number 202321060569, filed on Sep. 8, 2023. The entire contents of the aforementioned application are incorporated herein by reference.

TECHNICAL FIELD

The embodiments herein generally relate to the field of bidding strategies in energy markets and, more particularly, to a method and system for equilibrium solution for Periodic Double Auctions (PDAs) to generate optimal bidding strategies for the energy market.

BACKGROUND

Auctions are mechanisms that facilitate buying and selling of goods between market participants. A double auction consists of multiple buyers and sellers submitting their asks and bids to a market institution in order to procure a target unit of a commodity. A bid or ask consists of a price quantity pair (p,q) indicating that the participant is willing to buy/sell 'q' units of the commodity at a unit price p. The market institution matches the buy bids with the seller asks to determine the clearing price and cleared quantities for all sellers and buyers. These type of auctions are very prevalent in stock exchanges and energy markets. For example, in energy markets, power generating companies are the sellers while energy brokers servicing retail customers are the buyers, and an energy market regulator plays the role of the central market institution. Since the volume of trade is very high in such markets, it is prudent to design an optimal bidding strategy on behalf of a market participant to bring in profits and system efficiency to the ecosystem. The design of such optimal bidding strategies become more pronounced in a periodic double auction (PDA) setup, also referred to as multi-shot set up, wherein buyers and sellers participate in a (finite) sequence of auctions to exchange certain units of a commodity. For example, an energy broker, armed with an estimated energy requirement for a future time slot, participates in day-ahead auctions, to procure the required energy from power generating companies by competing with other energy brokers. In these auctions, the broker will have more than one opportunity to procure the estimated energy by participating in a sequence of auctions. Evidently, in this PDA setup, an optimal bidding strategy involves planning across current and future time auctions and any small improvement in the bidding strategies of the market participants can lead to improved profits and systemic efficiency.

Equilibrium solutions for double auctions have been studied extensively in the past. For example, the work of Satterthwaite and Williams proved the existence of non-trivial equilibria for k-double auctions. Analytical solutions for Nash equilibrium strategies for double auctions with average clearing price rule (ACPR) have been derived for the one buyer one seller, which is a single shot case for uniformly distributed valuations and scale based strategies. The Nash equilibrium in game theory is a situation in which a player will continue with their chosen strategy, having no incentive to deviate from it, after taking into consideration the opponent's strategy Thus, most of the existing approaches based on finding equilibrium solutions are developed for single shot (single agent) cases and not PDAs which is a multi-shot or multiagent scenario. It can be understood that sequential decision making in a multi-agent setting was required to study PDAs. In recent years, Markov game framework has been in use to devise bidding strategies in multi-shot or PDA auctions wherein approaches such as multiagent Q-learning, multi-agent deep Q networks, deep deterministic policy gradients are deployed. However, much of these works consider only single-side auctions, where it is assumed that only one side is presenting bids (buyers) or asks (suppliers). Thus, true equilibrium, that needs to consider match of demand and supply with multiple players remains unaddressed. Thus, the above approaches do not involve deriving analytical solutions for equilibrium strategies for PDAs. Periodic double auction (PDA) setting is where buyers of the auction have multiple (but finite) opportunities to procure multiple but fixed units of a commodity. The goal of each buyer participating in such auctions is to reduce their cost of procurement by planning their purchase across multiple rounds of the PDA. Formulating such optimal bidding strategies in a multi-agent PDA setting is a challenging problem as such strategies involve planning across current and future auctions.

Furthermore, there are few works that propose modelling double auctions as Markov game and determining Nash equilibrium using Reinforcement Learning (RL) approaches to recommend optimal trading strategies for resource allocation in edge server market. Such RL based solutions are numerical setups that normally provides an approximate solution and are not exact. Second, using a numerical approach for equilibrium, or Nash strategies, involves offline or online training. Offline training would mean that the current solution is based on some past data, and there remains a risk of the model not being updated to current observations. In online learning—the model is updated on the fly, which means trade-off between time versus accuracy. Thus, in numerical approaches, if focus is on quick solutions, accuracy is compromised, and focus is on decent approximation time is lost. Furthermore, there is no way to check if the solution to arrive at optimal strategy that is eventually used in the art is really an equilibrium solution or is a Nash equilibrium. Works in the art just use a solution (either based on convergence or based on some stopping criterion) and tend to loosely use the word Nash because of use of algorithm based on game theory and reinforcement. Convergence to true Nash equilibria is hardly verified.

SUMMARY

Embodiments of the present disclosure present technological improvements as solutions to one or more of the above-mentioned technical problems recognized by the inventors in conventional systems.

For example, in one embodiment, a method for equilibrium solutions for multi-shot Periodic Double Auctions (PDAs) to generate optimal bidding strategies for the energy market is provided.

The method includes sourcing for a current round (h) from among a plurality of rounds (H) of an auction offered by a PDA before termination of the PDA, (i) a composite supply curve providing a set of asks that are ordered based on value of price-supply quantity pairs consolidated for a set of suppliers in an energy market, and (ii) an outstanding demand of energy of each of a set of buyers (N) participating in the PDA, wherein the PDA is modeled as a finite horizon Markov game ($\mathcal{M}$) for the set of buyers (N) restricted with the plurality of rounds (H) for procuring the outstanding demand of energy, wherein finite horizon Markov game ($\mathcal{M}$) is specified by a plurality of parameters comprising the plurality of buyers (N), a state space S defining distinct states of a buyer (b) among the plurality of buyers (N), an action set $A^b$ for the buyer (b) at the current round (h) among the plurality of rounds (H) a cost function representing a cost of energy procurement at the current round (h) for the buyer (b), and the plurality of rounds (H).

Further, the method includes applying a joint policy ($\pi_*^{b,h}(s)$) for each of the set of buyers for the current round (h), wherein the joint policy is determined in accordance with the finite horizon Markov game ($\mathcal{M}$) to generate an action for the buyer (b) defining an optimal bidding strategy with a price-demand quantity pair for procuring energy for the current round (h), wherein the joint policy minimizes the cost function at a Markov Perfect Nash Equilibrium (MPNE).

Obtaining the MPNE by applying the joint policy ($\pi_*^{b,h}(s)$) comprises: determining a position of the buyer (b) in a sorting list generated by sorting the outstanding demand of the set of buyers in increasing order; checking availability of sufficient rounds for remaining buyers except the buyer (b) to satiate the outstanding demand of the remaining buyers, wherein availability of the sufficient rounds is determined from the ordered set of asks obtained from the composite supply curve; applying a first policy ($\pi_2^{b,h}$) if sufficient round are available, and a second policy ($\pi_2^{b,h}$) if the sufficient round are unavailable.

The first policy comprising, if the sorting list determines that the buyer (b) has a maximum outstanding demand, and the sufficient rounds are available for the remaining buyers, (i) holding the buyer (b) until the outstanding demand of the remaining buyers is satiated, (ii) allowing the buyer (b) to buy the maximum outstanding demand at a price at which the outstanding demand of the remaining buyers gets cleared, and (iii) allowing the remaining buyers bid a price that is greater than a maximum ask from the set of asks.

The second policy comprising, if enough rounds are unavailable for the remaining buyers, then the buyer (b) determined as a first buyer from the sorting list whose outstanding demand when reduced from an overall demand of the set of buyers is cleared from the available supply, (i) allowing the buyer (b) to buy the maximum outstanding demand at the lowest price at which the outstanding demand of the buyer (b) gets cleared, and ii) allowing the remaining buyers bid a price that is greater than a maximum ask from the set of asks.

Further, the method includes computing an optimal bid comprising value of the price-demand quantity pair for the current round for each of the set of buyers in accordance with the joint policy. Furthermore, the method includes determining a market clearing price for trading of the energy by the set of buyers for the current round, wherein the market clearing price is determined using a market clearing price mechanism based on the composite supply curve and the optimal bid of each of the set of buyers comprising the price-demand quantity pair of each of the set of buyers. Computing the optimal bid for each of the set of buyers by applying the joint policy is repeated for each round until the plurality of rounds (H) are exhausted.

In another aspect, a system for equilibrium solutions for multi-shot Periodic Double Auctions (PDAs) to generate optimal bidding strategies for the energy market is provided. The system comprises a memory storing instructions; one or more Input/Output (I/O) interfaces; and one or more hardware processors coupled to the memory via the one or more I/O interfaces, wherein the one or more hardware processors are configured by the instructions to source for a current round (h) from among a plurality of rounds (H) of an auction offered by a PDA before termination of the PDA, (i) a composite supply curve providing a set of asks that are ordered based on value of price-supply quantity pairs consolidated for a set of suppliers in an energy market, and (ii) an outstanding demand of energy of each of a set of buyers (N) participating in the PDA, wherein the PDA is modeled as a finite horizon Markov game ($\mathcal{M}$) for the set of buyers (N) restricted with the plurality of rounds (H) for procuring the outstanding demand of energy, wherein finite horizon Markov game ($\mathcal{M}$) is specified by a plurality of parameters comprising the plurality of buyers (N), a state space S defining distinct states of a buyer (b) among the plurality of buyers (N), an action set $A^b$ for the buyer (b) at the current round (h) among the plurality of rounds (H) a cost function representing a cost of energy procurement at the current round (h) for the buyer (b), and the plurality of rounds (H).

Further, the one or more hardware processors are configured to apply a joint policy ($\pi_*^{b,h}(s)$) for each of the set of buyers for the current round (h), wherein the joint policy is determined in accordance with the finite horizon Markov game ($\mathcal{M}$) to generate an action for the buyer (b) defining an optimal bidding strategy with a price-demand quantity pair for procuring energy for the current round (h), wherein the joint policy minimizes the cost function at a Markov Perfect Nash Equilibrium (MPNE).

Obtaining the MPNE by applying the joint policy ($\pi_*^{b,h}(s)$) comprises: determining a position of the buyer (b) in a sorting list generated by sorting the outstanding demand of the set of buyers in increasing order; checking availability of sufficient rounds for remaining buyers except the buyer (b) to satiate the outstanding demand of the remaining buyers, wherein availability of the sufficient rounds is determined from the ordered set of asks obtained from the composite supply curve; applying a first policy ($\pi_2^{b,h}$) if sufficient round are available, and a second policy ($\pi_2^{b,h}$) if the sufficient round are unavailable.

The first policy comprising, if the sorting list determines that the buyer (b) has a maximum outstanding demand, and the sufficient rounds are available for the remaining buyers, (i) holding the buyer (b) until the outstanding demand of the remaining buyers is satiated, (ii) allowing the buyer (b) to buy the maximum outstanding demand at a price at which the outstanding demand of the remaining buyers gets cleared, and (iii) allowing the remaining buyers bid a price that is greater than a maximum ask from the set of asks.

The second policy comprising, if enough rounds are unavailable for the remaining buyers, then the buyer (b) determined as a first buyer from the sorting list whose outstanding demand when reduced from an overall demand of the set of buyers is cleared from the available supply, (i) allowing the buyer (b) to buy the maximum outstanding demand at the lowest price at which the outstanding demand of the buyer (b) gets cleared, and ii) allowing the remaining buyers bid a price that is greater than a maximum ask from the set of asks.

Further, the one or more hardware processors are configured to compute an optimal bid comprising value of the price-demand quantity pair for the current round for each set of buyers in accordance with the joint policy. Furthermore, the one or more hardware processors are configured to determine a market clearing price for trading of the energy by the set of buyers for the current round, wherein the market clearing price is determined using a market clearing price mechanism based on the composite supply curve and the optimal bid of each of the set of buyers comprising the price-demand quantity pair of each of the set of buyers. Computing of the optimal bid for each of the set of buyers by applying the joint policy is repeated for each round until the plurality of rounds (H) are exhausted.

In yet another aspect, there are provided one or more non-transitory machine-readable information storage mediums comprising one or more instructions, which when executed by one or more hardware processors causes a method for equilibrium solutions for multi-shot Periodic Double Auctions (PDAs) to generate optimal bidding strategies for the energy market.

The method includes sourcing for a current round (h) from among a plurality of rounds (H) of an auction offered by a PDA before termination of the PDA, (i) a composite supply curve providing a set of asks that are ordered based on value of price-supply quantity pairs consolidated for a set of suppliers in an energy market, and (ii) an outstanding demand of energy of each of a set of buyers (N) participating in the PDA, wherein the PDA is modeled as a finite horizon Markov game ($\mathcal{M}$) for the set of buyers (N) restricted with the plurality of rounds (H) for procuring the outstanding demand of energy, wherein finite horizon Markov game ($\mathcal{M}$) is specified by a plurality of parameters comprising the plurality of buyers (N), a state space S defining distinct states of a buyer (b) among the plurality of buyers (N), an action set $A^b$ for the buyer (b) at the current round (h) among the plurality of rounds (H) a cost function representing a cost of energy procurement at the current round (h) for the buyer (b), and the plurality of rounds (H).

Further, the method includes applying a joint policy ($\pi_*^{b,h}(s)$) for each of the set of buyers for the current round (h), wherein the joint policy is determined in accordance with the finite horizon Markov game ($\mathcal{M}$) to generate an action for the buyer (b) defining an optimal bidding strategy with a price-demand quantity pair for procuring energy for the current round (h), wherein the joint policy minimizes the cost function at a Markov Perfect Nash Equilibrium (MPNE).

Obtaining the MPNE by applying the joint policy ($\pi_*^{b,h}(s)$) comprises: determining a position of the buyer (b) in a sorting list generated by sorting the outstanding demand of the set of buyers in increasing order; checking availability of sufficient rounds for remaining buyers except the buyer (b) to satiate the outstanding demand of the remaining buyers, wherein availability of the sufficient rounds is determined from the ordered set of asks obtained from the composite supply curve; applying a first policy ($\pi_2^{b,h}$) if sufficient round are available, and a second policy ($\pi_2^{b,h}$) if the sufficient round are unavailable.

The first policy comprising, if the sorting list determines that the buyer (b) has a maximum outstanding demand, and the sufficient rounds are available for the remaining buyers, (i) holding the buyer (b) until the outstanding demand of the remaining buyers is satiated, (ii) allowing the buyer (b) to buy the maximum outstanding demand at a price at which the outstanding demand of the remaining buyers gets cleared, and (iii) allowing the remaining buyers bid a price that is greater than a maximum ask from the set of asks.

The second policy comprising, if enough rounds are unavailable for the remaining buyers, then the buyer (b) determined as a first buyer from the sorting list whose outstanding demand when reduced from an overall demand of the set of buyers is cleared from the available supply, (i) allowing the buyer (b) to buy the maximum outstanding demand at the lowest price at which the outstanding demand of the buyer (b) gets cleared, and ii) allowing the remaining buyers bid a price that is greater than a maximum ask from the set of asks.

Further, the method includes computing an optimal bid comprising value of the price-demand quantity pair for the current round for each of the set of buyers in accordance with the joint policy. Furthermore, the method includes determining a market clearing price for trading of the energy by the set of buyers for the current round, wherein the market clearing price is determined using a market clearing price mechanism based on the composite supply curve and the optimal bid of each of the set of buyers comprising the price-demand quantity pair of each of the set of buyers. Computing the optimal bid for each of the set of buyers by applying the joint policy is repeated for each round until the plurality of rounds (H) are exhausted.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 2A through 2B (collectively referred as FIG. 2) is a flow diagram illustrating a method for equilibrium solutions for multi-shot PDAs to generate optimal bidding strategies for the energy market, using the system depicted in FIG. 1, in accordance with some embodiments of the present disclosure.

Figure 1:
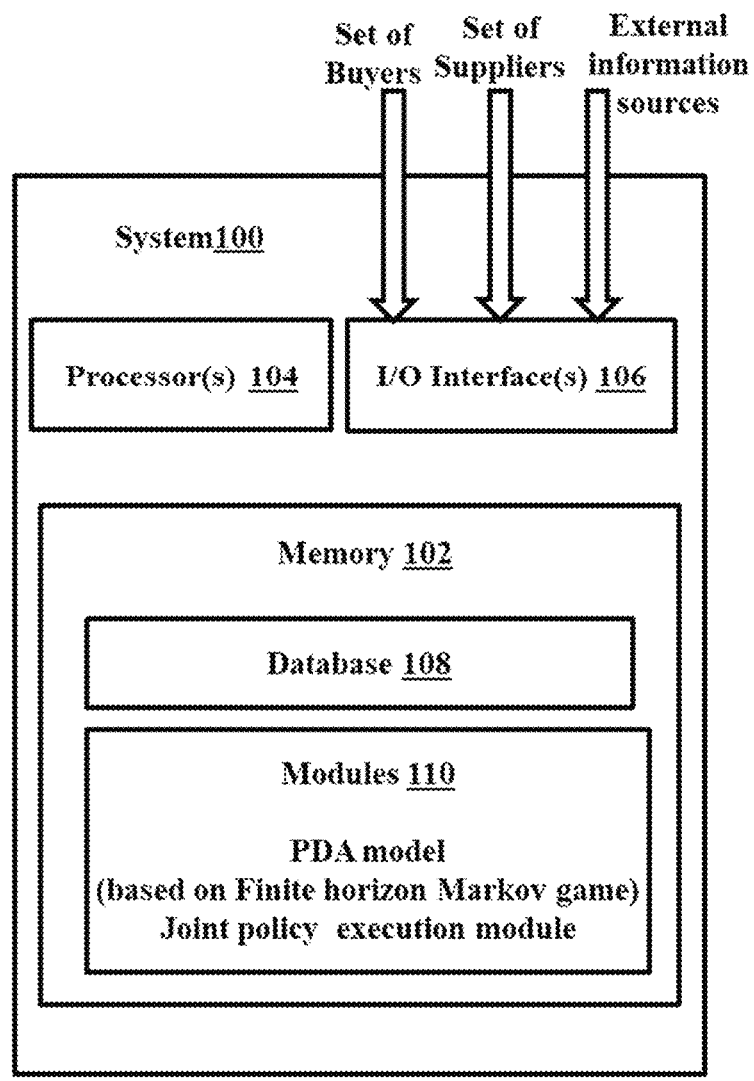
FIG. 1 is a functional block diagram of a system, for equilibrium solutions for multi-shot Periodic Double Auctions (PDAs) to generate optimal bidding strategies for the energy market, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Periodic double auction (PDA) setting is where buyers of the auction have multiple (but finite) opportunities to procure multiple but fixed units of a commodity. The goal of each buyer participating in such auctions is to reduce their cost of procurement by planning their purchase across multiple rounds of the PDA. Formulating such optimal bidding strategies in a multi-agent periodic double auction setting with double sided (buyer-seller consideration) is a technically challenging problem as such strategies involve planning across current and future auctions with consideration of demand and supply match Embodiments of the present disclosure provide a method and system for equilibrium solution for Periodic Double Auctions (PDAs) to generate optimal bidding strategies for the energy market.

The method and system disclosed models the PDA as a Markov game and derives Markov perfect Nash equilibrium (MPNE) solution, that enables formulating a joint policy for a buyer in consideration with remaining buyers to devise an optimal bidding strategy, wherein each buyer is allowed to make one bid per round of the PDA.

The joint policy formulated herein addresses the technical challenges for PDA equilibria by system sourcing information such as composite supply curve and demand requirement of all the buyers, wherein complete information is present to generate a closed form or easily computable expression for evaluation. The system enables distributing bidding for the entire outstanding demand of a buyer by spreading it optimally across the multiple bidding opportunities of the PDA such that the procurement cost is minimal for all the buyers participating in the bid. The efficacy of the Nash policies obtained is demonstrated with numerical experiments.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

FIG. 1 is a functional block diagram of a system 100, for equilibrium solution for Periodic Double Auctions (PDAs) to generate optimal bidding strategies for the energy market, in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface and the like to provide an interface for buyers and suppliers to place their bids and asks respectively for initiating bidding in the energy markets by receiving optimal bidding strategies for each auction round of PDA. The system 100, via the I/O interface 106 can connect with external sources and also sources to source energy market information such as a composite supply curve and the like. The I/O interface 106 can facilitate multiple communications within a wide variety of networks N/W and protocol types, including wired networks, for example, LAN, cable, etc., and wireless networks, such as WLAN, cellular and the like. In an embodiment, the I/O interface(s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In an embodiment, the memory 102 includes a plurality of modules 110 such as a PDA model (wherein the PDA is modeled as Finite horizon Markov game), a Joint policy execution module providing optimal bidding strategies to all buyers receiving bidding services from the system 100.

The plurality of modules 110 further include programs or coded instructions that supplement applications or functions performed by the system 100 for executing different steps involved in the process of obtaining equilibrium solutions for multi-shot PDAs to generate optimal bidding strategies for the energy market, being performed by the system 100. The plurality of modules 110, amongst other things, can include routines, programs, objects, components, and data structures, which performs particular tasks or implement particular abstract data types. The plurality of modules 110 may also be used as, signal processor(s), node machine(s), logic circuitries, and/or any other device or component that manipulates signals based on operational instructions. Further, the plurality of modules 110 can be used by hardware, by computer-readable instructions executed by the one or more hardware processors 104, or by a combination thereof. The plurality of modules 110 can include various submodules (not shown).

Further, the memory 102 may comprise information pertaining to input(s)/output(s) of each step performed by the processor(s) 104 of the system 100 and methods of the present disclosure.

Further, the memory 102 includes a database 108. The database (or repository) 108 may include a plurality of abstracted pieces of code for refinement and data that is processed, received, or generated as a result of the execution of the plurality of modules in the module(s) 110.

Although the data base 108 is shown internal to the system 100, it will be noted that, in alternate embodiments, the database 108 can also be implemented external to the system 100, and communicatively coupled to the system 100. The data contained within such an external database may be periodically updated. For example, new data may be added into the database (not shown in FIG. 1A) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to steps in flow diagrams in FIG. 2.

Figure 2B:
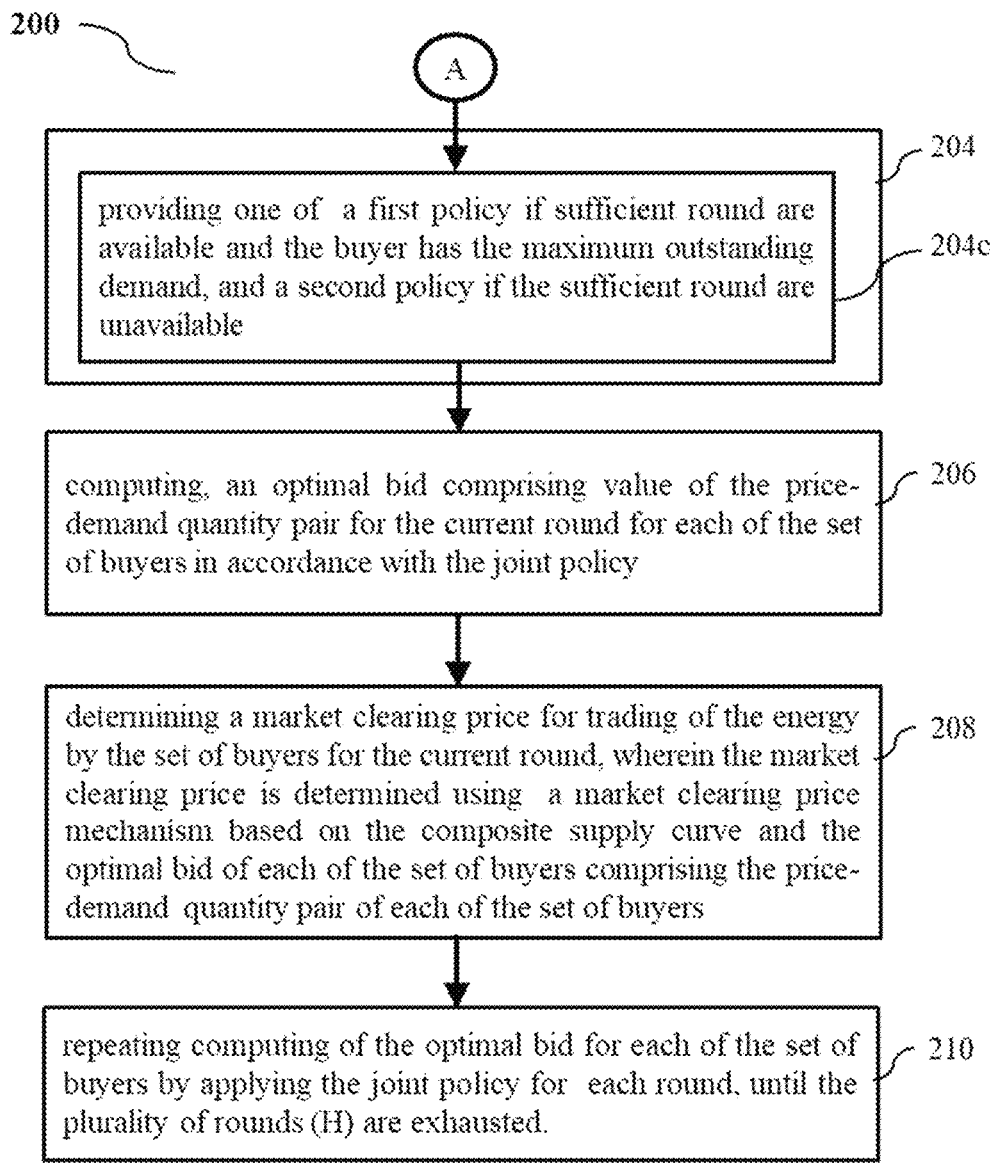

FIGS. 2A through 2B (collectively referred as FIG. 2) depict a flow diagram illustrating a method for equilibrium solutions for multi-shot PDAs to generate optimal bidding strategies for the energy market, using the system depicted in FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Referring to the steps of the method 200, at step 202 of the method 200, the one or more hardware processors 104 are configured by the instructions to source, for a current round (h) from among a plurality of rounds (H) of an auction offered by a PDA before termination of the PDA: (i) a composite supply curve providing a set of asks that are ordered based on value of price-supply quantity pairs consolidated for a set of suppliers in an energy market, and (ii) an outstanding demand of energy of each of a set of buyers (N) participating in the PDA. This information is sourced, for example, from external or internal sources or computed based on inputs received form from the buyers and suppliers.

The PDA herein is modeled as a finite horizon Markov game ($\mathcal{M}$) for the set of buyers (N) restricted with the plurality of rounds (H) for procuring the outstanding demand of energy, wherein finite horizon Markov game ($\mathcal{M}$) is specified by a plurality of parameters comprising the plurality of buyers (N), a state space S defining distinct states of a buyer (b) among the plurality of buyers (N), an action set $A^b$ for the buyer (b) at a current round (h) among the plurality of rounds (H) a cost function representing a cost of energy procurement at the current round (h) for the buyer (b), and the plurality of rounds (H).

The PDA considered herein is based on certain constraints or assumptions while carrying out equilibrium analysis as below: First, it is assumed that the total supply available is enough to meet the overall demand requirement and that all the asks from the suppliers can be clubbed into a composite supply curve and is made known to the system 100 to generate bids. This implies that the resultant Markov game has only the buyers as the game participants. Second, each PDA consists of a fixed number of rounds, i.e., each buyer has the same fixed number of auctions to procure their respective estimated demand. Third, buyers estimate their respective procurement need before the start of the first auction of the PDA and is sourced by the system 100. The estimate is not altered during the course of the PDA. Fourth, the buyers are not allowed to attempt to buy more than their outstanding requirement in any auction. Fifth, in the case that a particular buyer is not able to procure their targeted units of the commodity even after exhausting all rounds of the PDA, it will be procured outside of the auction at a higher cost. Finally, a uniform payment rule (UPR) is considered, wherein the clearing price decided through the auction mechanism is the same for all market participants.

PDA modeled as Markov game framework: The PDA consisting of N buyers with horizon H as a finite horizon Markov game. For any positive integer K, let [K] denote the set $\{1, \ldots, K\}$, consider a system of N buyers participating in H rounds of a PDA to procure multiple units of a commodity from a set of suppliers (sellers). For the purpose of this exposition, it can be assumed that the composite supply curve from all the sellers or suppliers at round h∈[H] consisting of $M^h$ asks is sourced by the system 100 (available to plan bidding strategies) and is given by $\mathcal{L}^h = \{(p_1^h, q_1^h), (p_2^h, q_2^h), \ldots (p_{M^h}^h, q_{M^h}^h)\}$ where $p_h \in [0, p_{max}]$ and $q_h \in [0, q_{max}]$ are respectively the price and quantity components of the ask $(p_{M^h}^h, q_{M^h}^h)$, with m∈[$M^h$] and $p_{max}$, $q_{max}$ are suitable upper bounds for the ask.

The Markov game is specified by $\mathcal{M} = \langle N, S, A, C, P, H \rangle$. The ingredients of M are a finite set of players N; a state space S; for each player b ∈ [N], an action set $A^b$; a transition probability P from S×A→S, where $A = x_b \in N A^b$ is the action profile, with P(s'|s,a) is the probability that the next state is s'∈ S, given the current state is s∈ S and current action profile is a∈A; and a payoff function (or cost function) C from S×A→$\mathbb{R}^N$, where the b-th coordinate of C is $C^b$, is the payoff to player b as a function of state and action profile.

More specifically, the state at round h denoted by $s^h$ is let to consist of $\{Q^h, \mathcal{L}^h\}$ and the action $a^{b,h} \in A^b$ by player b∈[N] at round h consists of $B^{b,h}$ bids, with each bid belong to the bounded set $[0, p_{max}] \times [0, q_{max}]$ with the condition that the sum of the quantity components of the bids does not exceed the outstanding demand of player b∈[N] at round h. The payoff or cost function $C^{b,h}$: S×A→R returns a scalar value to player b specifying players cost of procurement (if any) for the auction at round h. More precisely, $$C^{b,h}(s^h, a^h) = \begin{cases} \lambda^h \cdot \alpha^{b,h} & \text{at non terminal state } s^h \\ \Psi \times Q^{b,h} & \text{when } h = H+1, \end{cases} \quad (1)$$

where $a^h = (a^{b,h}, a^{-b,h}) \in A$ is the joint action set containing one action for each player at round h with $a^{-b,h}$ specifying the N−1 actions of all players except b. In addition, $\lambda^h \geq 0$ is the clearing price of the auction at round h, $\alpha^{b,h}$ is cleared quantity for the buyer b's bid b at round h. The entity $\Psi \geq 0$ is the unit price of procuring the commodity outside of the H auctions and $Q^{b,H+1}$ is the remaining units of the commodity to be procured by buyer b after exhausting the H rounds of the PDA. Given a state $s^h \in S$ and action profile $a^h \in A$, the next state at round h+1 is given by $s^{h+1} = \{Q^{h+1}, \mathcal{L}^{h+1}\}$, here $\mathcal{L}^{h+1}$ refers to the uncleared asks of the supply curve from round h and $Q^{h+1} = \{Q^{1,h+1}, \ldots, Q^{N, h+1}\}$ with $Q^{b,h+1} = Q^{b,h} - \alpha^{b,h} \ \forall b \in [N]$. The above mathematical statement indicates that a decision (action) taken for current round (h) by all buyers is based on current information, which takes all buyers to a next state that is influenced or varied based on actions of all buyers in previous round.

At any round h, having seen the state $s^h$, the players choose their action based on a policy. A (Markov) policy for a player b∈[N] is a collection of policies $\pi^b = \{\pi^{b,h}: S \to \Delta_{Ab}\}_{h=1}^H$, where each $\pi^{b,h}(\cdot|s^h) \in \Delta_{Ab}$ specifies the probability of taking action $a^h \in A^b$ at state $s^h$. Let $\pi=(\pi^b,\pi^{-b})$ be the joint policy containing one policy for each player $b \in [N]$ where $\pi^{-b}$ denotes the N−1 policies of all players except b. The value of a joint policy $\pi$, at round h, for any player b is a function $V_\pi^h: S \rightarrow \mathbb{R}$ defined as below. The value of joint policy $\pi$ (not necessary Markov), the value at round h, for a player $b \in [N]$ is given by, $$V_\pi^h(S) = \mathbb{E}_{\tau \sim (P,\pi^b,\pi^{-b})}\left[\sum_{h'=h}^{H+1} C^{b,h'}(s^{h'}, a^{b,h'}, a^{-b,h'})\middle| s^h = s\right] \quad (2)$$

with $a^{b,h'} \sim \pi^b$ and $a^{-b,h'} \sim \pi^{-b}$ and $\tau$ is a trajectory of the Markov game generated by the joint policy $\pi$. As the Markov game pertaining to the PDA herein involves cost minimization as the objective, the optimal policy for any player is to find a policy that minimizes the value function. However, in a multiagent scenario, when other players act rationally, finding optimal policy is equivalent to finding (Nash) equilibrium solutions which is the best response to rational behavior of other participating agents. Hence, for the PDA modeled as a Markov game, Markov Perfect Nash Equilibrium (MPNE) solutions is defined as below: Definition 1: Given a N player finite horizon stochastic game specified by $\mathcal{M} = \langle N, S, A, C, P, H \rangle$ a joint policy $\pi^* = [\pi_*^b, \pi_*^{-b}]$ is a (Markov) perfect Nash equilibrium (MPNE) if for all $b \in [N]$, for all $s \in S$, for all $h \in [H]$ and for all $\pi b: S \rightarrow \Delta_{Ab}$, there exists:

$$V^h_{\pi_*^b,\pi_*^{-b}}(s) = V^h_{\pi^b,\pi_*^{-b}}(s) \quad (3)$$

The perfectness of the Nash equilibrium is due to condition that the inequality in Definition (1) holds for every round $h \in [H]$ and for every element of the state space S.

A NASH Strategy for the Single Bid Case-Formulating the Joint Policy:

As is well-known in the art the total demand requirement of all buyers and total supply available from all suppliers at round h from the total rounds H can be obtained. The total supply available, at any round $h \in [H]$, is given by equation 4.

$$Q^{S,h} = \sum_{m \in [M_h]} q_m^h. \quad (4)$$

Denote the outstanding requirement of a buyer $b \in [N]$ at round h as $Q^{b,h} \geq 0$. Let $Q^h = \{Q^{1,h}, Q^{2,h}, \ldots, Q^{N,h}\}$ be the vector that contains the outstanding requirement of all the N buyers at round h. Let $B^h$ denote the set of all bids placed by all buyers at round h, wherein, each buyer $b \in [N]$ places at most one bid consisting of price-quantity pair $(p^{b,h}, q^{b,h})$ with $p^{b,h} \in [0, p_{max}]$ and $q^{b,h} \in [0, Q^{b,h}]$. The number of bids placed at round h is given by $B^h \leq N$ and the total demand from all buyers round h is given by equation 5.

$$Q^{\mathcal{D},h} = \sum_{b \in [N]} q^{b,h} \quad (5)$$

At each round h, let $[N^h]$ denote the set of N players indexed by the decreasing order of their quantity requirement. Now, let un be the index of the ask from the set such that all of the demand requirement at round h is met. That is, $u_h = \text{argmin}_j Q^{\mathcal{D}} \leq \sum_{m=1}^{j} q_m^h$. At round h, denote $Q^{\mathcal{D}-b,h} = Q^{\mathcal{D},h} - Q^{b,h}$, $b \in [N^h]$ as the demand requirement of all players except the player b. Let von, $b \in [N^h]$ be the lowest index of the ordered set $\mathcal{L}^h$ such that the total supply available for the first $v^b_h$ asks satisfies the demand requirement of all players except b. That is, $v^b_h = \text{argmin}_j Q_{\mathcal{D}-b} \leq \sum_{m=1}^{j} q_m^h \; \forall b \in [N^h]$. Next, defined is the index $z_h$ as $z_h = u_h - (H-h)$. Finally, let $\psi^h = \max\{1, \text{argmax}_j\{v_h^j \leq z_h\}\}$ as the player who bids $p_{z_h}$ and let $\phi_h$ as the player with maximum requirement. Note that $\psi^h = \phi^h$ when $\psi^h = 1$.

The joint policy $\pi^*$ for a player $b \in [N^h]$ at round $h \in [H]$ for state $s^h \in S$, can now be formulated as:

$$\pi_1^{b,h}(s) = \begin{cases} p^{b,h} = 0, q^{b,h} = Q^{b,h} & \text{if } Q^{b,h} = 0, \forall b \in [N^h] \\ \pi_1^{b,h}(s) & \text{if } H - h \geq u_h - v_h^\phi \\ \pi_2^{b,h}(s) & \text{otherwise} \end{cases} \quad (5)$$

Where the policies $\pi_1^{b,h}(s)$ and $\pi_2^{b,h}(s)$ are defined as, $$\pi_1^{b,h}(s) = \begin{cases} p^{b,h} = p_{v_h^\phi}, q^{b,h} = Q^{b,h} & \text{if } Q^{b,h} > 0, b = \phi^h \\ p^{b,h} = p_{max}, q^{b,h} = Q^{b,h} & \text{if } Q^{b,h} > 0, b \neq \phi^h \end{cases}$$

$$\pi_2^{b,h}(s) = \begin{cases} p^{b,h} = p_{zh}, q^{b,h} = Q^{b,h} & \text{if } Q^{b,h} > 0, b = \psi^h \\ p^{b,h} = p_{max}, q^{b,h} = Q^{b,h} & \text{if } Q^{b,h} > 0, b \neq \psi^h \end{cases}$$

Based on the formulated joint policy, for the current round, at step 204 of the method 200, the joint policy implementation module executed by the one or more hardware processors 104 are configured by the instruction to apply the a joint policy $(\pi_*^{b,h}(s))$ for each of the set of buyers for the current round (h). The joint policy is determined in accordance with the finite horizon Markov game ($\mathcal{M}$) to generate an action for the buyer (b) defining an optimal bidding strategy with a price-demand quantity pair for procuring energy for the current round (h). The joint policy, so formulated minimizes the cost function at a Markov Perfect Nash Equilibrium (MPNE) as understood form equation 1, 2 and 3.

Obtaining the MPNE by applying the joint policy $(\pi_*^{b,h}(s))$ as in equation 5 comprises following steps:
1. Determine a position of the buyer (b) in a sorting list generated by sorting the outstanding demand of the set of buyers in increasing order (204a).
2. Checking availability of sufficient rounds $(H-h \geq u_h - v_h^\Phi)$ for remaining buyers except the buyer (b) to satiate the outstanding demand of the remaining buyers. The availability of the sufficient rounds is determined from the ordered set of asks obtained from the composite supply curve (204b).
3. Provide one of a first policy $(\pi_1^{b,h})$ if sufficient rounds $(H-h \geq u_h - v_h^\Phi)$ are available, and a second policy $(\pi_2^{b,h})$ if the sufficient round are unavailable (204c).
   The first policy $(\pi_1^{b,h})$: If the sorting list determines that the buyer (b) has a maximum outstanding demand, and the sufficient rounds are available for the remaining buyers:
   (i) holding the buyer (b) until the outstanding demand of the remaining buyers is satiated, and
   (ii) allowing the buyer (b) to buy the maximum outstanding demand at a price at which the outstanding demand of the remaining buyers gets cleared,
   (iii) allowing the remaining buyers to bid a price that is greater than a maximum ask from the set of asks.

The second policy ($\pi_2^{b,h}$): If enough rounds are unavailable (H−h<$u_h$−$v_h^\phi$), for the remaining buyers, then the buyer (b) determined as a first buyer ($\psi$) from the sorting list whose outstanding demand when reduced from an overall demand of the set of buyers is cleared from the available supply:
  (i) allowing the buyer (b) to buy the maximum outstanding demand at the lowest price at which the outstanding demand of the buyer (b) gets cleared, and
  (ii) allowing the remaining buyers to bid a price that is greater than a maximum ask from the set of asks.

An illustrative example below simplifies the logical flow of the system 100 to determine whether the first policy or the second policy is to be applied.

Figure 3A:
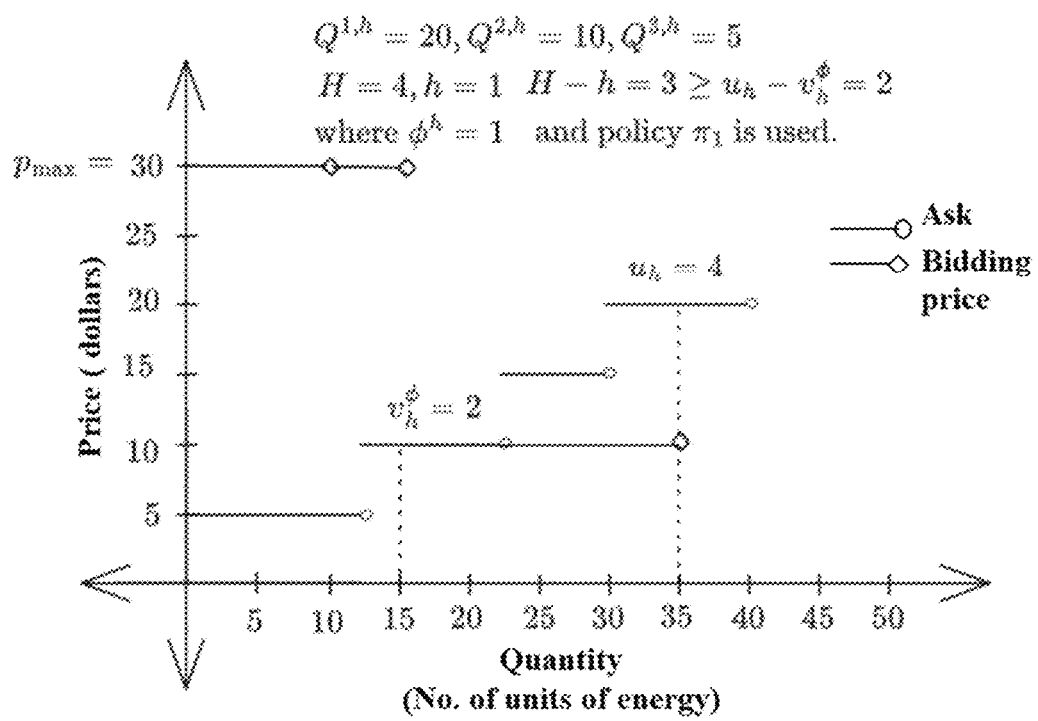
FIGS. 3A and 3B illustrates approach used for checking of conditions to be satisfied to decide on joint policy to be applied by the system at a specific round among a plurality of rounds of auction opportunities of the PDA, in accordance with some embodiments of the present disclosure.
Figure 3B:
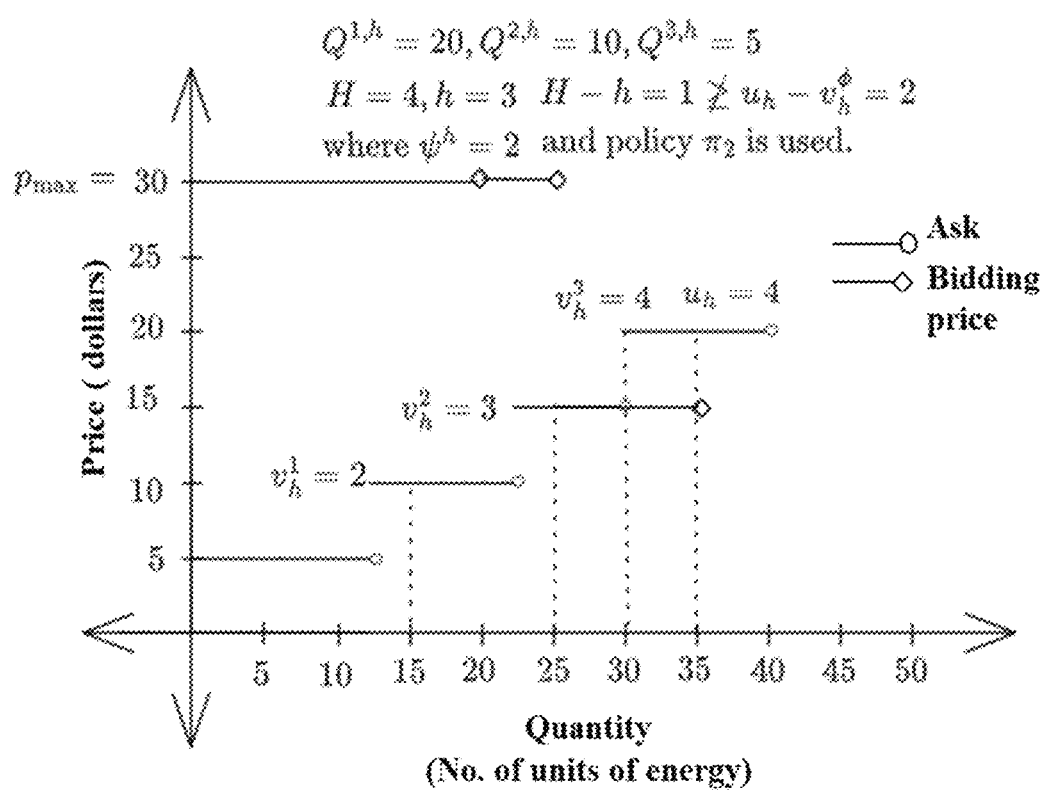

FIGS. 3A and 3B (collectively referred as FIG. 3) illustrates approach used for checking of conditions to be satisfied to decide on the joint policy to be applied by the system 100 at a specific round among a plurality of rounds of auction opportunities of the PDA, in accordance with some embodiments of the present disclosure. FIGS. 3A and 3B depicts the composite supply curve sourced by the system for a given PDA indicating the ask for supplier end, wherein each ask is a pair of price in dollars against number of units of energy (p,q). Further, the FIGS. 3A and 3B also depicting three buyers ($Q_1$, $Q_2$, $Q_3$) interested in the PDA having total 4 rounds of auction (H=4), with outstanding demand requirement of 20, 10 and 5 units of energy respectively. Thus, here buyer $Q_1$ is buyer having maximum demand requirement. The total supply provided by the set of suppliers, as seen for composite supply curve is 40 units, and exceeds the total demand of (20+10+5=35 units) by the three buyers. The composite supply curve consists of 4 asks sorted in increasing order price and energy units as:

Sorted List of Asks
  Index 1—(5,12)
  Index 2—(10,23)
  Index 3—(15,30)
  Index 4—(20,43)

The interpretation of sorted list of asks is well understood by person having ordinary skill in the domain. Thus, the first ask means that first 12 units of power is available at 5 dollars and second the next 11 units is available at 10 dollars and so on (the second ask being (10,23) means that the next 11 units (23-12) is available at 10 units).

The finite horizon length for the example of FIG. 3 is 4 (H=4). In FIG. 3A, the current round is the first round of the auction with h=1. The available rounds, after the first round is over, is H−h; (4−1=3). The term $u_h$ corresponds to index value in the sorted list of asks above where all of the 35 units of demand by all the buyers gets satisfied. Thus, $u_h$=4. Similarly, $v_h^\phi$ refers to the index value of ask where the total demand of remaining buyers ($Q_2$, $Q_3$) excluding the demand of maximum demanding buyer $Q_1$ is satisfied (10+5 units is satisfied at Index 2, i.e., $v_h^\phi$=2). Hence the condition check for deciding on first policy or second policy evaluates to H−h (4−1=3)>$u_h$−$v_h^\phi$(4−2=2). This satisfies the condition requirement for first policy and the system 100 executes first policy.

In the second figure, assuming the current round is h=3, wherein the total demand of (20+10+5=35 units) is made by the three buyers. In this case, with the assumption that composite supply curve is unaltered, $u_h$=4 is still valid. However, unlike FIG. 3A, while evaluating policy in this scenario, the condition H−h (4−3=1)<$u_h$−$v_h^\phi$(4−2=2) and therefore there are no sufficient rounds to satiate the demand, and the second policy is executed by the system 100.

Once the joint policy is executed, at step 206 of the method 200, the one or more hardware processors 104 are configured by the instructions to compute an optimal bid comprising value of the price-demand quantity pair for the current round for each of the set of buyers in accordance with the joint policy. The computed optimal bid is such that it provides least procurement cost or least expenditure (cost function minimization or pay off minimization) to each buyer. This is further elaborated in section 'equilibrium analysis' later.

In an practical implementation scenario, the computed optimal bids comprising value of the price-demand quantity pair for the current round are notified to each buyer and a confirmation is sought before proceeding with computation of market clearing price.

At step 208 of the method 200, the one or more hardware processors 104 determine a market clearing price for trading of the energy by the set of buyers for the current round. The market clearing price (MCP($\lambda$)) is determined using well known in the art market clearing price (MCP) mechanism based on the composite supply curve and the computed optimal bid of each of the set of buyers comprising the price-demand quantity pair of each of the set of buyers. The market clearing mechanism can be but not limited to the average clearing price rule (ACPR).

The ACPR is a special case of k-Double auction (k∈[0, 1]), where k=0.5 for ACPR. The MCP in k-Double auction is defined as $\lambda^h = k \cdot p_d^h + (k-1) \cdot p_l^{b,h}$ where $p_d^h$ and $pp_l^{b,h}$ are the last cleared ask and bid prices.

In particular for ACPR, the clearing price is $$\lambda^h = \frac{p_d^h + p_l^{b,h}}{2}.$$

Here, the bids greater than $p_l$ are fully cleared and the bid $p_l^{b,h}$ is either fully or partially cleared. Similarly, the asks lesser than $p_d^h$ are fully cleared and the ask $p_d^h$ is either fully or partial cleared. The cleared quantity of the last cleared ask and bid depends on the total cleared quantity $Q^h$. Moreover, this total cleared quantity in the clearing mechanism is given as $Q^h = \min \{\sum_{j=1}^{d} q_j^h, \sum_{i=1}^{dl} q_i^{b,h}\}$.

Further, the steps 202 to 208 are iteratively performed at each successive round till plurality of rounds (H) Of the PDA are exhausted to computing the optimal bid for each of the set of buyers by applying the joint policy for the successive rounds.

Since the uncleared supply curve and the outstanding demand of buyers is a fresh input to every round, the joint policy when executed in each round automatically applies the variations while computing the optimal bidding strategy (p,q) pairs for each buyer for each successive round of auction.

Evaluation of the joint policy $\pi_*^{b,h}$ at round h, for player b∈[$N^h$] at state $s^h$∈S: For that, the MCP ($\lambda^h$), total market cleared quantity $Q^h$ and the cleared quantity $\alpha^{b,h}$ for a buyer b while adopting the policy $\pi_*^{b,h}$ at round h ∈[H] for state $s^h$ for different scenarios is tabulated in the Lemma 1 below.

Lemma 1: If at round h, the available supply is adequate to satisfy the outstanding requirement of all players, that is, $Q^{\mathcal{D},h} \leq Q^{S,h}$ and if all the buyers, also referred to as game participants or players, follow the policy $\pi_*^{b,h}$ given as in Equation (5), then Table 1 gives the clearing price and quantity for the players.

TABLE 1

CLEARED PRICE AND QUANTITIES

| Condition: $H - h \geq u_h - v_h^\phi$<br>The clearing price is $\lambda_h = P_{v_h^\phi}$<br>The total market cleared quantity at round h is, | Condition: $H - h < u_h - v_h^\phi$<br>The clearing price is $\lambda_h = P_{z_h}$<br>The total market cleared quantity at round h is, |
|---|---|
| $Q_*^h = \min\left(\sum_{j=1}^{v_h^\phi} q_j^h, \sum_{b \in [N]} Q^{b,h}\right)$ | $Q_*^h = \min\left(\sum_{j=1}^{z_h} q_j^h, \sum_{b \in [N]} Q^{b,h}\right)$ |
| The bids placed by any player $b \neq \phi^h$, at round h gets fully cleared. That is, $\alpha^{b,h} = Q^{b,h}, \forall b \neq \phi$. The bids placed the player $b = \phi^h$ at round h, gets cleared as, | The bids placed by any player $b \neq \psi^h$, at round h gets fully cleared. That is, $\alpha^{b,h} = Q^{b,h}, \forall b \neq \psi^h$. The bids placed the player $b = \psi^h$ at round h, gets cleared as, |
| $\alpha^{b,h} = \left(Q^h - \sum_{b \in [N] \setminus \phi^h} q_j^{b,h}\right)$ | $\alpha^{b,h} = \left(Q^h - \sum_{b \in [N] \setminus \psi^h} q_j^{b,h}\right)$ |

Proof: First note that policy $\pi_*^{b,h}$ has just two price bids with the highest bid price at $p_{max} \geq p_M^h$. This implies that there exists at least one bid that is greater than some ask and hence the total cleared quantity $Q^h > 0$. In the case, that at round h, there is adequate supply to cater to the demand of all buyers, that is, $Q^{D,h} \leq Q^{S,h}$, the player $\phi^h$ has maximum requirement and the bid at price $p_{v_h^\phi}$. By construction, $p_{v_h^\phi}$ is also the point where the supply and demand curve intersect and hence the MCP is $p_{v_h^\phi}$. It is now easy to see that, the total market cleared quantity is given by, $$Q^h = \min\left(\Sigma_{j=1}^{v_h^\phi} q_j^h, \Sigma_{b \in [N^h]} Q^{b,h}\right) \quad (6)$$

As the bids placed at the higher price $p_{max}$ gets cleared first and since the available supply is enough to cater to outstanding demand requirement at round h, bids gets cleared exactly as stated in the first column of the Table 1 in Lemma 1. In similar lines, it can be shown for the case $(H-h<u_h-v_h^\phi)$.

Having described the clearing implications for a buyer $b \in [N^h]$ for following the policy $\pi_*^{b,h}(s)$ of Equation (5) at state $s^h \in S$, now computed is the value of the equilibrium policy for a buyer $b \in [N^h]$ which follows from Lemma 1. When $(H-h \geq u_h - v_h^\phi)$, it can be seen that $$V_{\pi_*^b,\pi_*^{-b}}^h(s) = \begin{cases} p_{v_h^\phi} \times Q^{b,h}, & \text{if } b \neq \phi^h \\ [p_{v_h^\phi} \times (Q^h - \Sigma_{b \in [N] \setminus \phi^h} q_j^{b,h}) + \Sigma_{k=h+1}^H p_{v_k^\phi} \times Q^k], & \text{if } b \neq \phi^h \end{cases} \quad (7)$$

$$V_{\pi_*^b,\pi_*^{-b}}^h(s) = \begin{cases} p_{z_h} \times Q^{b,h}, & \text{if } b \neq \psi^h \\ [p_{z_h} \times (Q^h - \Sigma_{b \in [N] \setminus \psi^h} q_j^{b,h}) + \Sigma_{k=h+1}^H p_{z_k} \times Q^k], & \text{if } b \neq \psi^h \end{cases} \quad (8)$$

Equilibrium analysis: In this section, for the PDA considered in this exposition, it is shown that the policy in (equation 5) is an MPNE in the space of all deterministic policies. More precisely, it is needed to show that, for all $b \in [N^h]$, for all $s \in S$, for all $h \in [H]$ and for any deterministic policy $\pi^b: S \to A_b$, and as in equation 3, $V_{\pi_*^b,\pi_*^{-b}}^h(s) = V_{\pi^b \pi_*^{-b}}^h(s)$.

Denote the bid of buyer $b \in [N^h]$ at state s and round h as prescribed by the policy $\pi_*^{b,h}(s)$ as $(p_*^{b,h}, q_*^{b,h})$. Further, recall that each bid of a player $b \in [N^h]$ belongs to the bounded set $[0, p_{max}] \times [0, q_{max}]$ and at any round h, the player b does not bid more than the outstanding demand requirement $Q^{b,h}$, the possible deviations available for a player b at a state s and round h can be tabulated as in table 2 below.

TABLE 2

POSSIBLE DEVIATIONS

| Higher Priced Deviations | Lower Priced Deviations |
|---|---|
| $p_b^{b,h} > p^{*b,h}$,<br>$q_b^{b,h} < q^{*b,h}$<br>$p_b^{b,h} > p^{*b,h}$,<br>$q_b^{b,h} = q^{*b,h}$ | $p_b^{b,h} < p^{*b,h}$,<br>$q_b^{b,h} < q^{*b,h}$<br>$p_b^{b,h} < p^{*b,h}$,<br>$q_b^{b,h} = q^{*b,h}$ |
| Equal Priced Deviation | |
| $p_b^{b,h} = p^{*b,h}$,<br>$q_b^{b,h} < q^{*b,h}$ | |

Given these deviations, it can be shown that, at any state s and at any round h, a player $b \in [N^h]$ deviating from the policy $\pi$ (Equation 5) in any of the ways listed above (Table 2) will not incur any less expenditure (minimal payoff function or cost function) than what is accounted for via the value functions in Equations (7) and (8). To this end, provided are the results that will be used later in the analysis. The first result provides an insight into how the MCP varies across the rounds of a PDA.

Lemma 2: Consider a PDA with H rounds with ACPR (example MCP mechanism). In the case when the composite supply curve does not change across the rounds of the PDA, the MCP ($\lambda$) at rounds h and h+1, are related as, $\lambda^{h+1} \geq \lambda h$.

Proof: It can be noted that once ACPR is chosen for a PDA as the clearing mechanism at every round $h \in [H]$, the MCP is $$\lambda^h = \frac{p_d^h + p_l^{b,h}}{2},$$

which lies in the interval $[p_d^h, p_l^{b,h}]$ where $p_d^h$ is the price of the last cleared ask and $p_l^{b,h}$ is the price of the last cleared bid (at round h). The result now follows by noting that the uncleared asks of round h, from which the asks of round h+1 would be rolled out, have prices greater than or equal to $p_d^h$.

Recalling that the policy in Equation (5), suggests that N−1 players (buyers) to bid at price $p_{max}$ and the remaining player to bid at a specified (lower) price. The next result states that any deviations in the bid, by a player recommended to bid at price pmax, at any round $h \in [H]$, might reduce his cost of procurement.

Lemma 3: Let the conditions of Lemma 2 hold with $\Psi > \beta \cdot p_{max}$ ($\beta > 1$) and let $\omega \in [N^h]$ be a player that is prescribed by the joint policy in Equation (5) to bid at price $p_{max}$ to procure his outstanding demand requirement at round h. If the player deviates from the said policy to another policy $\pi$ at round h at state s, then, from equation 3, $V_{\pi_*^\omega \pi_*^{-\omega}}^h(s) = V_{\pi^\omega \pi_*^{-\omega}}^h(s)$.

Proof: Among the five deviations enumerated in Table 2, the deviations suggesting that the bid price greater than $p_{max}$ are not applicable to player $\omega$ as by design $p_{max}$ is the maximum bid price. The other three deviations (at round h) either suggest that the bid of player $\omega$ has bid price less than equal to $p_{max}$ or bid quantity less than equal to $Q^{\omega,h}$. In the case $q^{\omega,h} < Q^{\omega,h}$, the bid placed by $\omega$ will lose out on priority when compared to following the joint policy in Equation (5). This implies that the bid quantity $Q^{\omega,h}$ could be partially cleared at round h (as opposed to $Q^{\omega,h}$ being fully cleared if joint policy (equation 5) is followed). Further, by Lemma 2, as the remaining requirement of $Q^{\omega,h}$ is likely to be cleared at higher price in future rounds, the overall cost incurred by player ω is greater than or equal to the cost incurred when joint policy in (equation 5) is followed. Now if player ω deviates in bid price but with fixed bid quantity as $q^{\omega,h}=Q^{\omega,h}$. First, when there are enough or sufficient rounds for player $\phi^h$, i.e., $(H-h \geq u_h - v_h^{\Phi})$ and the player $\phi^h$ deviates below the price $p_{max}$ then priority would decrease and hence it leads to increase in cost.

Next if the player $\phi^h$ does not have enough or sufficient rounds $(H-h < u_h - v_h^{\Phi})$, the policy $(\pi_2^{b,h})$ is used. Here, it is considered are the deviations by two types of player ω. That is, if player ω has requirement greater than the player bidding at $p_{zh}$, then with bid price $p^{\omega,h} \in [p_{zh}, p_{max})$, the value function is unchanged for player ω. However, if the player ω bids at price $p^{\omega,h} \in [p_{v_h \psi}, p_{zh})$, by construction the number of remaining rounds for the player b would be less. Hence the player has to buy non-zero quantity from balancing market at a price Ψ. Finally, if the player ω has less requirement than the player bidding at $p^{zh}$, then with bid price $p^{\omega,h} \in (p_{zh}, p_{max})$, the value function is unchanged for player ω. And for the bid price $p^{\omega,h} = p_{zh}$, the value function might increase due to lemma 2. Now, for the bid price $p^{\omega,h} \in [p_{v_h \psi}, p_{zh})$, the condition on $\Psi > \beta \cdot p_{max}$ will lead to higher value function for the player b.

Lemma 4: Let the conditions of Lemma 2 with the balancing cost $\Psi > \beta \cdot p_{max}$ ($\beta > 1$) and let $\omega \in [N^h]$ be a player that is prescribed by the policy in Equation (3) to bid at the price $p_{v_h \phi}$ or $p_{zh}$ to procure its outstanding demand requirement at round h. If the player deviates to another policy π at round h, instead of following the policy in Equation (3), then, for any state $s \in S$, $V_{\pi_*^{\omega} \pi_*^{-\omega}}^h(s) = V_{\pi^{\omega} \pi_*^{-\omega}}^h(s)$.

Proof: Here for player ω, all the five deviations listed in ~~Equation~~ Table 2) are possible. Now if the policy recommended is $\pi_1^{b,h}$ with the bid price $p_{v_h \phi}$, the deviations with the bid price greater than $p_{v_h \phi}$ will increase the MCP hence increases the value function. Next if the bid price is less than $p_{v_h \phi}$, by construction the player φ is not cleared. Similarly for bidding $q^{b,h} < Q^{b,h}$, the cleared quantity is less. Hence in both cases, with Lemma 2, the cost increases.

For the policy $\pi_2^{b,h}$, the recommended price is $p_{zh}$. If the player ω bids at a price more than $p_{zh}$, then the MCP at round h would be greater than or equal to $p_{zh}$ resulting in possible increase of overall cost of procurement. And, if the player bids at price $p_{zh}$ with bid quantity less than $Q^{\omega,h}$, the cleared quantity could be less than the demand procured by following policy (5) which would imply more demand needs to be satisfied in the remaining rounds. Again from Lemma 2, this could lead to higher procurement. Finally, if the bid price is $p^{\omega,h} \in [p_{v_h \psi}, p_{zh})$ then by the choice of $\Psi > \beta \cdot p_{max}$, the value function increases.

Theorem 1: Let the conditions of Lemma 2 hold with the balancing cost $\Psi > \beta \cdot p_{max}$ ($\beta > 1$). If a buyer $b \in [N^h]$ deviates to another policy π at round h, instead of following the policy in Equation (3), then, for any state $s \in S$ and $h \in [H]$, $V_{\pi_*^{\omega} \pi_*^{-\omega}}^h(s) = V_{\pi^{\omega} \pi_*^{-\omega}}^h$ Proof: From Lemmas 2, 3 and 4 the value function of the policy of equation 5 satisfies $V_{\pi_*^{\omega} \pi_*^{-\omega}}^h(s) = V_{\pi^{\omega} \pi_*^{-\omega}}^h(s)$.

Note that the policy in (equation 5) is a Markov policy since it depends on only on present state s not on history and since the above Lemmas hold for all s E S and $h \in [H]$, the policy in (equation 5) is an MPNE for the Markov game described in Section III for the case when each buyer submits one bid per round of the PDA.

SIMULATIONS: This section considers a simple numerical setup to demonstrate the efficacy of the Nash policies described herein. The setup consists of three players (buyers) in the market. The players go through a PDA simulator, which has H=24 rounds to procure the required quantity. The quantity requirement of the four players (P0, P1, P2) at some round h≤H is given as $Q^h$=(232.18,164.6,90.7). The players P0 and P2 are the players with the largest, and smallest requirement respectively. The players know the supply curve (ask pattern) $\mathcal{L}^h$ which has 31 asks and the total supply $Q^S$=1502.38>$Q^{D,h}$=487.48. We consider two values of h, namely h=1 and h=23, wherein the choice h=1 satisfies the condition $(H-h \geq u_h - v_h^{\Phi})$ and the latter does not.

Figure 4:
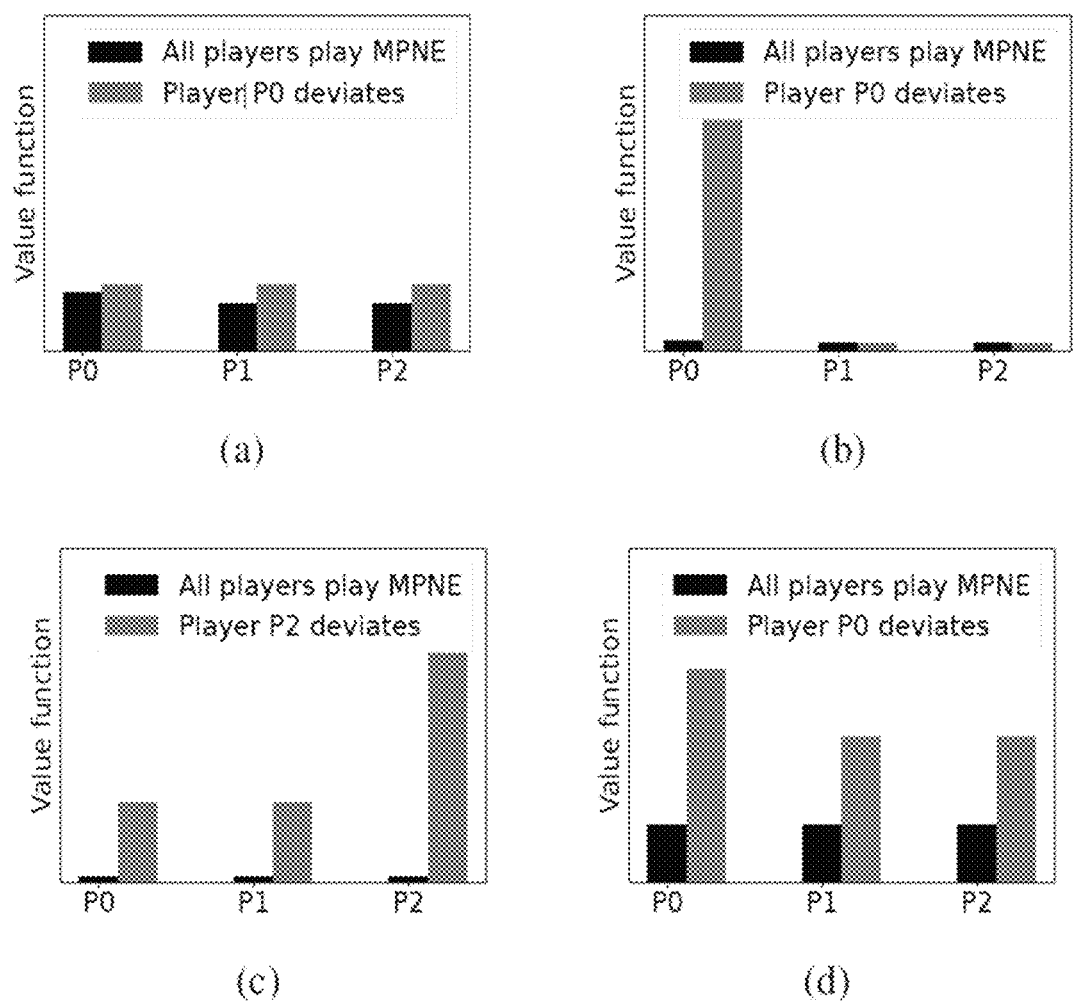
FIG. 4 illustrates comparison of value function of Markov Perfect Nash Equilibrium (MPNE) using graphical charts, in accordance with some embodiments of the present disclosure.

FIG. 4 depicting subfigures (a) though (d) is comparison of the value function of MPNE and deviation. FIG. 4, (a), the value function for h=1 with the player P0 deviating to a price higher than $p_{zh}$. FIG. 4, (b) the value function for h=23 with player P0 deviating from MPNE to a lesser price than the prescribed price $p_{max}$. FIG. 4, (c) the value function for h=24 with player P2 deviating from Nash policy to bid at a price lower than $p_{zh}$. FIG. 4, (d) the average cost incurred by players in a series of 100 PDAs each with horizon H=24 with deviation by player P0 to ZI policy FIG. 4, (a) compares the value function when all players adopt the policy in (equation 5) with a joint policy in which player P0 deviates to a bid price higher than the prescribed price $p_{zh}$ at h=1. The higher bid price of P0 results in higher cost because of increased MCP. In FIG. 3 (b), for h=23, the condition $(H-h \geq u_h - v_h^{\Phi})$ is not satisfied and hence the prescribed bid price of P0 is $p_{max}$. When P0 bids less than $p_{max}$ its bid priority decreases resulting in procurement outside of the PDA at higher cost Ψ thereby increasing the overall cost. FIG. 4, (c), considers the case h=24, wherein the condition $(H-h \geq u_h - v_h^{\Phi})$ is not satisfied. Here, the deviation by the minimum requirement player P2 to bid at a price p∈(pvψ, pzh) less than the prescribed price $p_{zh}$. This deviation to a lower price, although results in lower cost of procurement at round h, leads to higher overall cost as the player has to buy more units of the commodity outside of the auction at higher price $\Psi > \beta \cdot p_{max}$. Finally, in FIG. 3, (d), considered is average cost incurred by the players in 100 PDAs (each with H=24 rounds) with varying demand requirement. In each of these 100 PDAs, the player P0 is allowed to deviate from the prescribed Nash policy to the Zero intelligent (ZI) policy and the corresponding value functions are compared with the value function for the Nash policy.

Thus, the method and system disclosed herein generates optimal bidding strategies for the periodic double auction (PDA) setting consisting of multiple buyers competing with each other to satisfy their respective demand. Each buyer has multiple opportunities to procure their need and the composite supply curve is known to all of them. The problem is modeled as the Markov game and system generates equilibrium solutions that could act as optimal bidding strategies when all buyers behave rationally. It is proved that joint policy applied by the system are indeed MPNE. The system disclosed that implements the joint policy devises optimal bidding strategies for day-ahead electricity markets.

Although constraints such as having adequate supply with one bid per auction per buyer, are considered, the case of multiple bids per auction and inadequate supply can be handled using the techniques disclosed. Despite the fact that the equilibrium solutions disclosed herein are for the complete information setting, they are still important for two reasons. The system and method provides a technical solution for the unaddressed problem of providing analytical equilibrium solutions for multi-shot auctions in PDA. The joint policy disclosed can be used as a baseline to compare with a policy that is obtained in an incomplete information setting The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for generating optimal bidding strategies for Periodic Double Auctions (PDAs) in an energy market, the method comprising:

sourcing, via one or more hardware processors, for a current round (h) from among a plurality of rounds (H) of an auction offered by a PDA before termination of the PDA, (i) a composite supply curve providing a set of asks that are ordered based on value of price-supply quantity pairs consolidated for a set of suppliers in an energy market, and (ii) an outstanding demand of energy of each of a set of buyers (N) participating in the PDA, wherein the PDA is modeled as a finite horizon Markov game ($\mathcal{M}$) for the set of buyers (N) restricted with the plurality of rounds (H) for procuring the outstanding demand of energy, wherein finite horizon Markov game ($\mathcal{M}$) is specified by a plurality of parameters comprising the plurality of buyers (N), a state space S defining distinct states of a buyer (b) among the plurality of buyers (N), an action set $A^b$ for the buyer (b) at the current round (h) among the plurality of rounds (H) a cost function representing a cost of energy procurement at the current round (h) for the buyer (b), and the plurality of rounds (H);

applying, via the one or more hardware processors, a joint policy ($\pi_*^{b,h}(s)$) for each of the set of buyers for the current round (h), wherein the joint policy is determined in accordance with the finite horizon Markov game ($\mathcal{M}$) to generate an action for the buyer (b) defining an optimal bidding strategy with a price-demand quantity pair for procuring energy for the current round (h), wherein the joint policy minimizes the cost function at a Markov Perfect Nash Equilibrium (MPNE), wherein obtaining the MPNE by applying the joint policy ($\pi_*^{b,h}(s)$) comprises:

determining a position of the buyer (b) in a sorting list generated by sorting the outstanding demand of the set of buyers in increasing order;

checking availability of sufficient rounds for remaining buyers except the buyer (b) to satiate the outstanding demand of the remaining buyers, wherein availability of the sufficient rounds is determined from the ordered set of asks obtained from the composite supply curve;

applying a first policy ($\pi_1^{b,h}$) if sufficient round are available, and a second policy ($\pi_2^{b,h}$) if the sufficient round are unavailable, wherein:

the first policy comprising, if the sorting list determines that the buyer (b) has a maximum outstanding demand, and the sufficient rounds are available for the remaining buyers, (i) holding the buyer (b) until the outstanding demand of the remaining buyers is satiated, (ii) allowing the buyer (b) to buy the maximum outstanding demand at a price at which the outstanding demand of the remaining buyers gets cleared, and (iii) allowing the remaining buyers bid a price that is greater than a maximum ask from the set of asks; and the second policy comprising, if enough rounds are unavailable for the remaining buyers, then the buyer (b) determined as a first buyer from the sorting list whose outstanding demand when reduced from an overall demand of the set of buyers is cleared from the available supply, (i) allowing the buyer (b) to buy the maximum outstanding demand at the lowest to bid at which the outstanding demand of the buyer (b) gets cleared, and ii) allowing the remaining buyers bid a price that is greater than a maximum ask from the set of asks;

computing, via the one or more hardware processors, an optimal bid comprising value of the price-demand quantity pair for the current round for each of the set of buyers in accordance with the joint policy; and determining, via the one or more hardware processors, a market clearing price for trading of the energy by the set of buyers for the current round, wherein the market clearing price is determined using a market clearing price mechanism based on the composite supply curve and the optimal bid of each of the set of buyers comprising the price-demand quantity pair of each of the set of buyers.

2. The method of claim 1, wherein computing the optimal bid for each of the set of buyers by applying the joint policy is repeated for each round until the plurality of rounds (H) are exhausted (210).

3. The method of claim 1, wherein obtaining the MPNE by applying the joint policy considers a set of constraints comprising:

the total supply available from the set of suppliers is enough to meet a total demand from the set of buyers, wherein the set of asks from the set of suppliers is clubbed into the composite supply curve and is known to plan the optimal bids during the PDA, wherein the PDA, modeled as the finite horizon Markov game ($\mathcal{M}$), includes the set of buyers as game participants and excludes the set of suppliers;

the plurality of rounds (H) is finite for the PDA;

a precomputed estimate of the outstanding demand of each buyer from a set of buyers to be procured before start of a first round among the plurality of rounds (H) of the PDA, and the precomputed estimate of the outstanding demand that remains unaltered during the plurality of rounds (H) of the PDA;

each buyer is not allowed to buy more than the outstanding demand in any of the plurality of rounds (H);

if the buyer is unable to procure the outstanding demand post exhausting the plurality of rounds (H), a deficit is procured outside of the auction at a higher cost; and executing a uniform payment rule (UPR), wherein, the market clearing price is kept same across the set of buyers (b).

4. The method of claim 1, wherein the market clearing price per unit of the energy for each round among the plurality of rounds (h) is determined using an average clearing price rule (ACPR).

5. A system for generating optimal bidding strategies for Periodic Double Auctions (PDAs) in an energy market, the system comprising:

a memory storing instructions;

one or more Input/Output (I/O) interfaces; and one or more hardware processors coupled to the memory via the one or more I/O interfaces, wherein the one or more hardware processors are configured by the instructions to:

source for a current round (h) from among a plurality of rounds (H) of an auction offered by a PDA before termination of the PDA, (i) a composite supply curve providing a set of asks that are ordered based on value of price-supply quantity pairs consolidated for a set of suppliers in an energy market, and (ii) an outstanding demand of energy of each of a set of buyers (N) participating in the PDA, wherein the PDA is modeled as a finite horizon Markov game ($\mathcal{M}$) for the set of buyers (N) restricted with the plurality of rounds (H) for procuring the outstanding demand of energy, wherein finite horizon Markov game ($\mathcal{M}$) is specified by a plurality of parameters comprising the plurality of buyers (N), a state space S defining distinct states of a buyer (b) among the plurality of buyers (N), an action set $A^b$ for the buyer (b) at the current round (h) among the plurality of rounds (H) a cost function representing a cost of energy procurement at the current round (h) for the buyer (b), and the plurality of rounds (H);

apply a joint policy ($\pi_*^{b,h}(s)$) for each of the set of buyers for the current round (h), wherein the joint policy is determined in accordance with the finite horizon Markov game ($\mathcal{M}$) to generate an action for the buyer (b) defining an optimal bidding strategy with a price-demand quantity pair for procuring energy for the current round (h), wherein the joint policy minimizes the cost function at a Markov Perfect Nash Equilibrium (MPNE), wherein obtaining the MPNE by applying the joint policy ($\pi_*^{b,h}(s)$) comprises:

determining a position of the buyer (b) in a sorting list generated by sorting the outstanding demand of the set of buyers in increasing order;

checking availability of sufficient rounds for remaining buyers except the buyer (b) to satiate the outstanding demand of the remaining buyers, wherein availability of the sufficient rounds is determined from the ordered set of asks obtained from the composite supply curve;

applying a first policy ($\pi_1^{b,h}$) if sufficient round are available, and a second policy ($\pi_2^{b,h}$) if the sufficient round are unavailable, wherein:

the first policy comprising, if the sorting list determines that the buyer (b) has a maximum outstanding demand, and the sufficient rounds are available for the remaining buyers, (i) holding the buyer (b) until the outstanding demand of the remaining buyers is satiated, (ii) allowing the buyer (b) to buy the maximum outstanding demand at a price at which the outstanding demand of the remaining buyers gets cleared, and (iii) allowing the remaining buyers bid a price that is greater than a maximum ask from the set of asks; and the second policy comprising, if enough rounds are unavailable for the remaining buyers, then the buyer (b) determined as a first buyer from the sorting list whose outstanding demand when reduced from an overall demand of the set of buyers is cleared from the available supply, (i) allowing the buyer (b) to buy the maximum outstanding demand at the lowest price at which the outstanding demand of the buyer (b) gets cleared, and ii) allowing the remaining buyers bid a price that is greater than a maximum ask from the set of asks;

compute an optimal bid comprising value of the price-demand quantity pair for the current round for each of the set of buyers in accordance with the joint policy; and determine a market clearing price for trading of the energy by the set of buyers for the current round, wherein the market clearing price is determined using a market clearing price mechanism based on the composite supply curve and the optimal bid of each of the set of buyers comprising the price-demand quantity pair of each of the set of buyers.

6. The system of claim 5, wherein computing the optimal bid for each of the set of buyers by applying the joint policy is repeated for each round until the plurality of rounds (H) are exhausted.

7. The system of claim 5, wherein obtaining the MPNE by applying the joint policy considers a set of constraints comprising:

the total supply available from the set of suppliers is enough to meet a total demand from the set of buyers, wherein the set of asks from the set of suppliers is clubbed into the composite supply curve and is known to plan the optimal bids during the PDA, wherein the PDA, modeled as the finite horizon Markov game ($\mathcal{M}$), includes the set of buyers as game participants and excludes the set of suppliers;

the plurality of rounds (H) is finite for the PDA;

a precomputed estimate of the outstanding demand of each buyer from a set of buyers to be procured before start of a first round among the plurality of rounds (H) of the PDA, and the precomputed estimate of the outstanding demand that remains unaltered during the plurality of rounds (H) of the PDA;

each buyer is not allowed to buy more than the outstanding demand in any of the plurality of rounds (H);

if the buyer is unable to procure the outstanding demand post exhausting the plurality of rounds (H), a deficit is procured outside of the auction at a higher cost; and executing a uniform payment rule (UPR), wherein, the market clearing price is kept same across the set of buyers (b).

8. The system of claim 5, wherein the market clearing price per unit of the energy for each round among the plurality of rounds (h) is determined using an average clearing price rule (ACPR).

9. One or more non-transitory machine-readable information storage mediums comprising one or more instructions which when executed by one or more hardware processors cause a method for generating optimal bidding strategies for Periodic Double Auctions (PDAs) in an energy market, the method comprising:

sourcing for a current round (h) from among a plurality of rounds (H) of an auction offered by a PDA before termination of the PDA, (i) a composite supply curve providing a set of asks that are ordered based on value of price-supply quantity pairs consolidated for a set of suppliers in an energy market, and (ii) an outstanding demand of energy of each of a set of buyers (N) participating in the PDA, wherein the PDA is modeled as a finite horizon Markov game ($\mathcal{M}$) for the set of buyers (N) restricted with the plurality of rounds (H) for procuring the outstanding demand of energy, wherein finite horizon Markov game ($\mathcal{M}$) is specified by a plurality of parameters comprising the plurality of buyers (N), a state space S defining distinct states of a buyer (b) among the plurality of buyers (N), an action set $A^b$ for the buyer (b) at the current round (h) among the plurality of rounds (H) a cost function representing a cost of energy procurement at the current round (h) for the buyer (b), and the plurality of rounds (H);

applying a joint policy ($\pi_*^{b,h}(s)$) for each of the set of buyers for the current round (h), wherein the joint policy is determined in accordance with the finite horizon Markov game ($\mathcal{M}$) to generate an action for the buyer (b) defining an optimal bidding strategy with a price-demand quantity pair for procuring energy for the current round (h), wherein the joint policy minimizes the cost function at a Markov Perfect Nash Equilibrium (MPNE), wherein obtaining the MPNE by applying the joint policy ($\pi_*^{b,h}(s)$) comprises:

determining a position of the buyer (b) in a sorting list generated by sorting the outstanding demand of the set of buyers in increasing order;

checking availability of sufficient rounds for remaining buyers except the buyer (b) to satiate the outstanding demand of the remaining buyers, wherein availability of the sufficient rounds is determined from the ordered set of asks obtained from the composite supply curve;

applying a first policy ($\pi_1^{b,h}$) if sufficient round are available, and a second policy ($\pi_2^{b,h}$) if the sufficient round are unavailable, wherein:

the first policy comprising, if the sorting list determines that the buyer (b) has a maximum outstanding demand, and the sufficient rounds are available for the remaining buyers, (i) holding the buyer (b) until the outstanding demand of the remaining buyers is satiated, (ii) allowing the buyer (b) to buy the maximum outstanding demand at a price at which the outstanding demand of the remaining buyers gets cleared, and (iii) allowing the remaining buyers bid a price that is greater than a maximum ask from the set of asks; and the second policy comprising, if enough rounds are unavailable for the remaining buyers, then the buyer (b) determined as a first buyer from the sorting list whose outstanding demand when reduced from an overall demand of the set of buyers is cleared from the available supply, (i) allowing the buyer (b) to buy the maximum outstanding demand at the lowest to bid at which the outstanding demand of the buyer (b) gets cleared, and ii) allowing the remaining buyers bid a price that is greater than a maximum ask from the set of asks;

computing an optimal bid comprising value of the price-demand quantity pair for the current round for each of the set of buyers in accordance with the joint policy; and determining, a market clearing price for trading of the energy by the set of buyers for the current round, wherein the market clearing price is determined using a market clearing price mechanism based on the composite supply curve and the optimal bid of each of the set of buyers comprising the price-demand quantity pair of each of the set of buyers.

10. The one or more non-transitory machine-readable information storage mediums of claim 9, wherein computing the optimal bid for each of the set of buyers by applying the joint policy is repeated for each round until the plurality of rounds (H) are exhausted (210).

11. The one or more non-transitory machine-readable information storage mediums of claim 9, wherein obtaining the MPNE by applying the joint policy considers a set of constraints comprising:

the total supply available from the set of suppliers is enough to meet a total demand from the set of buyers, wherein the set of asks from the set of suppliers is clubbed into the composite supply curve and is known to plan the optimal bids during the PDA, wherein the PDA, modeled as the finite horizon Markov game ($\mathcal{M}$), includes the set of buyers as game participants and excludes the set of suppliers;

the plurality of rounds (H) is finite for the PDA;

a precomputed estimate of the outstanding demand of each buyer from a set of buyers to be procured before start of a first round among the plurality of rounds (H) of the PDA, and the precomputed estimate of the outstanding demand that remains unaltered during the plurality of rounds (H) of the PDA;

each buyer is not allowed to buy more than the outstanding demand in any of the plurality of rounds (H);

if the buyer is unable to procure the outstanding demand post exhausting the plurality of rounds (H), a deficit is procured outside of the auction at a higher cost; and executing a uniform payment rule (UPR), wherein, the market clearing price is kept same across the set of buyers (b).

12. The one or more non-transitory machine-readable information storage mediums of claim 9, wherein the market clearing price per unit of the energy for each round among the plurality of rounds (h) is determined using an average clearing price rule (ACPR).

* * * * *